United States Patent
Wagner et al.

(10) Patent No.: US 12,296,521 B2
(45) Date of Patent: May 13, 2025

(54) PROCEDURE FOR DETERMINING REAL MOLDING FRONTS AND ALIGNING SIMULATIONS

(71) Applicant: ENGEL AUSTRIA GmbH, Schwertberg (AT)

(72) Inventors: Paul Joachim Wagner, Asten (AT); Georg Pillwein, Linz (AT)

(73) Assignee: ENGEL AUSTRIA GMBH, Schwertberg (AT)

(*) Notice: Subject to any disclaimer, the term of this patent is extended or adjusted under 35 U.S.C. 154(b) by 0 days.

(21) Appl. No.: 18/765,787

(22) Filed: Jul. 8, 2024

(65) Prior Publication Data
US 2024/0359381 A1   Oct. 31, 2024

Related U.S. Application Data

(62) Division of application No. 17/070,406, filed on Oct. 14, 2020, now Pat. No. 12,064,909.

(30) Foreign Application Priority Data

Oct. 15, 2019  (AT) ................... A 50885/2019

(51) Int. Cl.
  *B29C 45/76*   (2006.01)
  *B29C 45/77*   (2006.01)
  (Continued)

(52) U.S. Cl.
CPC ............ *B29C 45/766* (2013.01); *B29C 45/77* (2013.01); *B29C 45/78* (2013.01); *B29C 45/80* (2013.01);
(Continued)

(58) Field of Classification Search
None
See application file for complete search history.

(56) References Cited

U.S. PATENT DOCUMENTS

| 5,578,256 A | 11/1996 | Austin |
| 5,900,259 A | 5/1999 | Miyoshi et al. |

(Continued)

FOREIGN PATENT DOCUMENTS

| CA | 2910499 C | * | 2/2021 | ............ B29C 45/03 |
| CN | 104608351 | | 5/2015 | |

(Continued)

OTHER PUBLICATIONS

U. Vietri et al., "Improving the Predictions of Injection Molding Simulation Software", Polymer Engineering & Science, vol. 51, No. 12, pp. 2542-2551, Jul. 25, 2011.

*Primary Examiner* — Jennifer L Norton
(74) *Attorney, Agent, or Firm* — Wenderoth, Lind & Ponack, L.L.P.

(57) ABSTRACT

A method for determining positions of a real moulding material front during a process to be carried out with a moulding machine, wherein
  a simulation progression (SV) of a variable characteristic of the processa is calculated,
  positions of a simulated moulding material front are determined from the simulation,
  the real process is carried out, and at least one measurement progression (MV) of the at least one characteristic variable is measured directly or indirectly,
  a transformation is chosen, which has at least one parameter ($\Delta V$, kp, $V_{unknown}$),
  the transformation is applied to the at least one simulation progression (SV), with the result that a transformed simulation progression (tSV) is formed, and
  a parameter value is determined for the parameter ($\Delta V$, kp, $V_{unknown}$) such that a deviation between the measurement progression (MV) and the transformed simulation
(Continued)

progression (tSV) is minimized according to a predetermined error measure or according to an operator input.

13 Claims, 10 Drawing Sheets

(51) Int. Cl.
  *B29C 45/78* (2006.01)
  *B29C 45/80* (2006.01)
  *G05B 19/406* (2006.01)
(52) U.S. Cl.
  CPC .. *G05B 19/406* (2013.01); *B29C 2945/76006* (2013.01); *B29C 2945/76013* (2013.01); *B29C 2945/7604* (2013.01)

(56) References Cited

U.S. PATENT DOCUMENTS

| | | | |
|---|---|---|---|
| 6,658,319 | B2 | 12/2003 | Shioiri et al. |
| 9,555,571 | B1 | 1/2017 | Chang et al. |
| 10,201,918 | B1 | 2/2019 | Favaloro et al. |
| 10,836,088 | B2 | 11/2020 | Fick et al. |
| 10,987,841 | B2 | 4/2021 | Mensler et al. |
| 10,987,842 | B2 | 4/2021 | Mensler et al. |
| 2002/0188375 | A1 | 12/2002 | Shioiri et al. |
| 2004/0047935 | A1* | 3/2004 | Moss ................ B29C 45/2704 425/149 |
| 2004/0210429 | A1 | 10/2004 | Yu |
| 2005/0114104 | A1 | 5/2005 | Friedl |
| 2006/0082009 | A1* | 4/2006 | Quail ................... B29C 45/766 700/200 |
| 2012/0059637 | A1 | 3/2012 | Yu |
| 2012/0203375 | A1 | 8/2012 | Dorin |
| 2013/0255371 | A1 | 10/2013 | Beaumont |
| 2017/0021544 | A1 | 1/2017 | Pollard |
| 2018/0117816 | A1 | 5/2018 | Mensler et al. |
| 2018/0117817 | A1 | 5/2018 | Mensler et al. |
| 2018/0178430 | A1 | 6/2018 | Stoehr |
| 2018/0181694 | A1 | 6/2018 | Springer |
| 2018/0203431 | A1 | 7/2018 | Stoehr |
| 2018/0304513 | A1 | 10/2018 | Fick et al. |
| 2020/0202235 | A1 | 6/2020 | Chen |
| 2020/0290257 | A1 | 9/2020 | Bazzo |
| 2021/0326498 | A1 | 10/2021 | Wagner |
| 2021/0370568 | A1* | 12/2021 | Shimada ................ B29C 45/77 |
| 2022/0266492 | A1 | 8/2022 | Glaser |
| 2023/0241826 | A1 | 8/2023 | Tsigkopoulos |

FOREIGN PATENT DOCUMENTS

| | | |
|---|---|---|
| CN | 108724664 | 11/2018 |
| DE | 102015107024 | 7/2016 |
| DE | 10 2015 107 025 | 11/2016 |
| DE | 10 2017 131 032 | 6/2018 |
| EP | 2 583 811 | 4/2013 |
| EP | 2427835 | 10/2018 |
| EP | 3 520 987 | 8/2019 |
| WO | 2016/177512 | 11/2016 |
| WO | 2016/177513 | 11/2016 |

* cited by examiner

PROCEDURE FOR DETERMINING REAL MOLDING FRONTS AND ALIGNING SIMULATIONS

BACKGROUND OF THE INVENTION

The present invention relates to methods and computer program products for determining positions of a moulding material front, in particular of a melt front, during a process to be carried out with a moulding machine, in particular an injection-moulding process. The invention furthermore relates to a method and a computer program product for aligning a simulation of a process to be carried out with a moulding machine with a process really carried out.

Within the meaning of the invention, processes which are to be carried out with a moulding machine are considered. Moulding processes with which moulded parts are produced are an important example of such processes. They include in particular injection-moulding processes.

Other processes which are a subject of the invention would be, for example, melt cushion experiments in order to investigate a behaviour of a moulding material, in particular of an injection-moulding material (thus in particular plasticized thermoplastic material), or purging experiments, wherein the moulding material is purged into the atmosphere.

By moulding machines may be meant injection-moulding machines, transfer-moulding presses, presses and the like.

In the following, the state of the art is described by reference to injection-moulding processes. However, analogous statements and conclusions also apply to general moulding processes.

EP 2583811 A1 discloses a method for operating an injection-moulding process as stably as possible. For this purpose, process fluctuations, i.e. fluctuations which occur from cycle to cycle in the real moulding process, are quantified and can thus be compensated for. The determination of positions of a melt front or the alignment (or even only the performance) of a simulation with the real moulding process are not a subject of EP 2583811 A1.

Independently of the problem of stable operation of a moulding process over many cycles, the moulding process must naturally first be set up, which is also referred to as set-up.

In setting up an injection-moulding process, a wide variety of settings of the injection-moulding machine have to be made in order to achieve a moulding process which produces moulded parts which meet the respective quality requirements. One of the settings which have to be made is the injection profile, i.e. the movement and/or force profile, which an actuator, usually in the form of a plasticizing screw, follows in order to take the moulding material into the at least one mould cavity to produce the moulded part.

For example, they can be chosen such that the speed at which the melt front fills the at least one mould cavity is as constant as possible, in particular in order to prevent internal stresses in the finished moulded part.

It is therefore clear that it is advantageous if the filling of the mould cavity can be tracked, i.e. if it can be ascertained where in the cavity the moulding material front is located at which point in time. Publications WO 2016/177512 A1 and WO 2016/177513 A1 set themselves this objective.

However, a disadvantage here is that it is necessary to make use of so-called events and event patterns, wherein these are ultimately certain features of a pressure progression in the moulding material during the injection. As can already be seen from the figures of these two disclosures, it will be very difficult in practice to detect these features of the pressure progression reliably and automatically within the framework of a data evaluation. Small kinks in the pressure progression, such as occur because of the geometry of the mould cavity, can already be identified only on close inspection with the human eye. In practice, there are therefore insurmountable obstacles to an automatic implementation for the detection of such features in a series production machine.

Another approach to setting up the moulding process is to adjust the simulation such that it models the real moulding process as realistically as possible, for which purpose US 2002188375 A1 aligns simulations on measurement results from the real moulding process with the simulation result. However, this alignment is effected by an operator, which is naturally not advantageous in the context of automation and reproducibility. In particular, as a result inaccuracies which are not apparent to the human eye cannot be detected.

SUMMARY OF THE INVENTION

The object of the present invention is to provide methods and computer program products, with which a reliable and reproducible determination of the positions of the moulding material front is possible. Analogously, in a further development of the invention it should be possible to reliably and reproducibly match a simulation to the real process.

With respect to the methods, this is effected, in that
within the framework of a simulation of the process at least one simulation progression of at least one variable that is characteristic of the process, in particular a simulated pressure progression, is calculated,
positions of a simulated moulding material front are determined from the simulation,
the real process is carried out, wherein at least one measurement progression of the at least one characteristic variable, in particular a measured pressure progression, is measured directly or indirectly,
at least one transformation is chosen, which has at least one parameter,
the at least one transformation is applied at least once to the at least one simulation progression, with the result that at least one transformed simulation progression is formed, at least one parameter value is determined for the at least one parameter such that a deviation between the at least one measurement progression and the at least one transformed simulation progression is minimized according to a predetermined error measure, and
the positions of the real moulding material front are determined by applying the at least one transformation with the determined at least one parameter value to the positions of the simulated moulding material front.

This is effected on the other hand with a method in which:
within the framework of a simulation of the process at least one simulation progression of at least one variable that is characteristic of the process, in particular a simulated pressure progression, is calculated,
positions of a simulated moulding material front are determined from the simulation,
the real process is carried out, wherein at least one measurement progression of the at least one characteristic variable, in particular a measured pressure progression, is measured directly or indirectly,
at least one transformation is chosen, which has at least one parameter, the at least one transformation is applied at least once to the at least one measurement progression, with the result that at least one transformed measurement progression is formed, at least one parameter value is determined for the at least one parameter such that a deviation between the at least one simulation progression and the at least one transformed measurement progression is minimized according to a predetermined error measure, and the positions of the real moulding material front are determined by applying at least one inverse of the at least one transformation with the determined at least one parameter value to the positions of the simulated moulding material front.

With respect to the computer program products, the object is achieved by commands which prompt a computer executing them to calculate at least one simulation progression of at least one variable that is characteristic of the process, in particular a simulated pressure progression, within the framework of a simulation or to receive one from a separate simulation, to determine positions of a simulated moulding material front from the simulation or to receive them from the separate simulation, to receive at least one measurement progression of the at least one characteristic variable, in particular a measured pressure progression, from the real process, to choose at least one transformation or to receive an input as to which at least one transformation is to be chosen, wherein the at least one transformation has at least one parameter, to apply the at least one transformation at least once to the at least one simulation progression, with the result that at least one transformed simulation progression is formed, to determine at least one parameter value for the at least one parameter such that a deviation between the at least one measurement progression and the at least one transformed simulation progression is minimized according to a predetermined error measure, and to determine the positions of the real moulding material front by applying the at least one transformation with the determined at least one parameter value to the positions of the simulated moulding material front, and to output the positions of the real moulding material front.

The object is achieved on the other hand with a computer program product which contains commands which prompt a computer executing them to calculate at least one simulation progression of at least one variable that is characteristic of the process, in particular a simulated pressure progression, within the framework of a simulation or to receive one from a separate simulation, to determine positions of a simulated moulding material front from the simulation or to receive them from the separate simulation, to receive at least one measurement progression of the at least one characteristic variable, in particular a measured pressure progression, from the real process, to choose at least one transformation or to receive an input as to which at least one transformation is to be chosen, wherein the at least one transformation has at least one parameter, to apply the at least one transformation at least once to the at least one measurement progression, with the result that at least one transformed measurement progression is formed, to determine at least one parameter value for the at least one parameter such that a deviation between the at least one simulation progression and the at least one transformed measurement progression is minimized according to a predetermined error measure, and to determine the positions of the real moulding material front by applying at least one inverse of the at least one transformation with the determined at least one parameter value to the positions of the simulated moulding material front, and to output the positions of the real moulding material front.

With regard to the further development of the invention, the object is achieved in that within the framework of a simulation of the process a simulation progression of a variable that is characteristic of the injection-moulding process, in particular a simulated pressure progression, is calculated, the real process is carried out, wherein at least one measurement progression of the characteristic variable, in particular a measured pressure progression, is measured directly or indirectly, at least one transformation is chosen, which has at least one parameter, the at least one transformation is applied at least once to the at least one simulation progression or the at least one measurement progression, with the result that at least one transformed simulation progression or at least one transformed measurement progression is formed, at least one parameter value is determined for the at least one parameter such that a deviation between the at least one measurement progression and the at least one transformed simulation progression or the at least one simulation progression and the at least one transformed measurement progression is minimized according to a predetermined error measure, and the simulation is altered on the basis of or with the at least one determined parameter value, in particular on the basis of the at least one transformation or at least one inverse of the at least one transformation, and carried out again.

By applying the transformation or the inverse of the transformation with the determined at least one parameter value to the positions of the moulding material front, the real positions of the moulding material front can be determined or determined at least approximately according to the invention. In the process, information is generated about the progression of the moulding material front over time during the process.

With regard to the further development of the invention, the object is achieved by commands which prompt a computer executing them to calculate at least one simulation progression of at least one variable that is characteristic of the process, in particular a simulated pressure progression, within the framework of a simulation or to receive one from a separate simulation, to receive at least one measurement progression of the at least one characteristic variable, in particular a measured pressure progression, from the real process, to choose at least one transformation or to receive an input as to which at least one transformation is to be chosen, wherein the at least one transformation has at least one parameter, to apply the at least one transformation at least once to the at least one simulation progression or the at least one measurement progression, with the result that at least one transformed simulation progression or at least one transformed measurement progression is formed, to determine at least one parameter value for the at least one parameter such that a deviation between the at least one measurement progression and the at least one transformed simulation progression or between the at least one simulation progression and the at least one transformed measurement progression is minimized according to a predetermined error measure, and to alter the simulation for one thing on the basis of or with the at least one determined parameter value, in particular on the basis of the at least one transformation or at least one inverse of the at least one transformation, and to carry it out again.

Within the framework of the invention, a single instance or several instances of the various real or virtual objects can in each case be considered/used, and in particular of the following: the at least one simulation progression, the at least one measurement progression, the at least one transformation, the at least one parameter, the at least one transformed simulation progression, the at least one transformed measurement progression, the at least one parameter value, the at least one inverse of the at least one transformation.

For easier readability of the description, in the following reference is made to these objects in some cases in the singular (e.g. the transformation) and in some cases in the plural (e.g. the transformations). However, the description is to be understood such that singular and plural are meant in each case.

The invention can be implemented both by applying the transformation to the simulation progression and by applying the transformation to the measurement progression, wherein in the latter case the inverse of the transformation is to be used in order to calculate the actual positions of the moulding material front. This applies similarly to the development of the invention in relation to altering and carrying out the simulation again.

In all developments of the invention, a deviation, corresponding to the transformation, between the simulation result and the measurement progression is quantified according to the invention by determining the at least one parameter value, i.e. the determined at least one parameter value indicates the magnitude of the deviation.

Because use is only made of measures that are relatively easy to implement (transformation, error minimization, error measure) in this quantification, the effect according to the invention of a reliable and reproducible determination of the positions of the moulding material front or matching of the simulation to the real process is achieved.

The various developments of the invention can of course be combined with each other.

As an alternative to the use of a mathematical error measure, the minimization of the deviation can be carried out according to an operator input. That is to say the deviation between (transformed) measurement progression and (transformed) simulation progression can be represented visually for an operator, who then chooses the at least one parameter value of the at least one transformation such that the deviation is minimized according to the operator's judgement.

For example, in the case of an injection-moulding process through the invention the injection profile can be adjusted such that the moulding material front has particular properties. One example would be a constant moulding material front speed. Moreover, core pullers which are actuated during the injection procedure can be better regulated.

Flaws in the moulded part can thus be better ascribed to actuator positions, which can be helpful in the process optimization. When carrying out filling studies, it can be helpful to visualize the moulding material front in order to estimate a minimum filling level (ejector pins), or a particular degree of filling can be set in a targeted manner.

Within the meaning of the invention, by simulations are meant computer simulations which simulate physical and/or chemical processes, which occur during the process to be considered, by means of a mathematical model. Within the meaning of the invention, however, there are no limitations as to how simple or complex these models have to be. That is to say there are in principle no restrictions as to how "realistically" or accurately the simulations model reality. In particular, the simulations can contain approximations and analytical partial calculations—in addition to the calculation inaccuracy that is present in any case.

Nor do the simulations have to model the whole process. In particular, in the case of injection-moulding processes only the filling procedure (injection procedure) can be simulated, for example. Naturally, it is also conceivable to simulate the substantially complete process, in which the machine behaviour can for example also be included.

It is an advantage of the invention that deviations between simulation and the real process, which arise through simulation of only a sub-process of the process, can also be recognized and/or compensated for.

When referring to positions of the real moulding material front or the real process, this is not to be taken to mean that the positions or other simulation results are intended to correspond exactly to reality because this would naturally be impossible due to inaccuracies from measurements and approximations that are always present. Rather, the real process and the real moulding material front are to be viewed in contrast to the virtual or simulated moulding processes and moulding material fronts, which are calculated virtually within the framework of the (computer) simulation. The "true" process and the "true" moulding material front and the approximate calculation thereof are thus meant.

The moulding material front is to be understood as the interface which forms between the moulding material during the movement into the mould cavity and the medium or vacuum hitherto present in the mould cavity.

The moulding material can preferably be a thermoplastic material, wherein the moulding process is then an injection-moulding process. In injection-moulding processes, additions, such as fibres, gases or powders, can, however, certainly be added to the plastic as loads.

The various developments of the invention (determining melt front or moulding material front or alignment of the simulation) can essentially be used for any process for which the corresponding simulation variant is present. This includes, for example, foaming methods, multi-component injection moulding, thermoset, silicone, elastomer, co-injection, injection compression moulding, variothermal tempering, reactive methods and the like.

The parameter that is characteristic of the process can in particular be characteristic of a sub-process of the moulding process. In the example of an injection-moulding process, it can be a parameter that is characteristic of the injection procedure, for example.

The positions of the moulding material front are to be understood as the positions which arise in the real process in chronological order, for example during the successive filling of the moulding cavity. The simulation according to the invention can naturally also detect the structure of the moulding material front-thus, for example, the spatial form of the moulding material front. Within the meaning of the invention, however, the positions of the moulding material fronts can already be indicated in the form of a single position per point in time (or another parameter corresponding to the respective point in time), namely independently of whether the simulation is carried out in 1, 2 or more spatial dimensions.

In the development of the invention, in principle only one single simulation has to be carried out in order to determine the positions of the moulding material fronts. Naturally, several simulations can also be carried out here. For easier readability, "simulation" and "simulations" are used interchangeably.

By applying the transformation with the determined at least one parameter value (or the inverse when the transformation is applied to the measurement progression) to the positions of the simulated moulding material front, the positions of the real moulding material front can be determined according to the invention, because the deviations between the real process and the simulated process have been quantified according to the invention by the determined at least one parameter value in combination with the transformation.

The use of simulation software, whether it be for designing plastic articles and associated tools, for fault correction or for the optimization of processes in the field of injection moulding and other methods connected thereto, has been increasing for years and will also increase further in the future.

Alongside the many advantages that simulations bring with them (e.g. cost saving during tool construction, since faults/problems can already be corrected in advance or time saving during fault finding in the case of an existing tool), it must be noted that a simulation can only partly model reality accurately. The more accurate the design of the simulation models (geometry, material models, starting and boundary conditions, etc.), the better they can also reproduce reality. Therefore the aim is always to model the simulation as accurately as possible, in order that the calculated simulation values come as close as possible to the measurement values of a real process.

Unfortunately, this is not always possible since, for example, certain geometries (hot runner, nozzle, space in front of the screw) and settings or items of information (melt temperature, friction losses, decompression, behaviour of the non-return valve, etc.) are not available from and on the machine etc., and for example material models which are used in the simulations do not model the real material behaviour 100% accurately (materials even of the same type differ from batch to batch or material parameters are not stored in the simulation for a particular material).

For this reason, deviations from the real process will normally occur in the results of a simulation carried out, which was modelled using data, knowledge and settings already available.

If the results (i.e. the parameter that is characteristic of the process, such as e.g. pressures, temperatures, etc.) from simulation and the real process are available, the simulation results are aligned according to the second development of the invention. This means that it is attempted to adjust the simulation model such that the same (or at least approximated) results as in the real process are obtained when the altered simulations are carried out again. This can be effected e.g. by altering injection profiles, melt temperatures, material models, geometries, etc. in the simulation model. As is noted, a large number of parameters can be adjusted for an alignment of simulation and the real process. The problem in this case is that it is not known which parameters have to be adjusted and to what extent, in order to obtain an adequate alignment. In particular, with the operator's naked eye, such as is provided for in the state of the art, inaccurate and unreproducible results are naturally obtained here.

To date, it has been usual in this case e.g. to carry out parameter studies with a large number of different variants of different combinations of parameters with differing values. By chance or even with a certain system, an alignment can then be achieved with a particular combination of parameters. The disadvantage here is that a large number of simulations have to be carried out before an adequate alignment can be achieved, and in addition it is difficult to be able to tell why which parameters had to be altered in the simulation, and to what extent, for the alignment.

The rectification of this problem is a further achievement of the invention in the further development of the invention.

By applying transformations, which quantify the respective deviations between simulation and the real process (after minimizing the error measure) and transform the simulation to the real process, and accordingly feeding the found transformation parameters back into the simulation, the alignment can be carried out (more) effectively because the required alterations in the simulation model can be inferred through the choice and determination of the values of the required parameters.

By minimizing the error measure, first the transformation parameters are calculated for the modelling of the simulation progression on the measurement progression. Thus before additional parameter studies have to be carried out by the Trial & Error method in order to find the correct parameter settings for the simulation, the simulation can in one fell swoop accordingly be adjusted with the aid of the transformation parameters in the following step, and countless simulations need not be started. This saves time and effort and through the transformations used it is possible to accurately tell what has not been modelled correctly in the simulation in comparison with the real process.

By knowing the particular parameter values, material models or the associated material parameters can for example be altered in the simulation model. This is a major advantage because firstly sufficient material parameter data are not available for many materials and secondly material data of one material type can differ from batch to batch. By adjusting the material model, this deviation can be effectively compensated for.

Data of the dead volume are often not modelled in a simulation model or the effects of the dead volume cannot be determined correctly, because the data required for this are not available or are only available incompletely. With the correct transformations these deviations between simulation and the real process can also be quantified and the simulation can then be aligned accordingly.

An additional major advantage of the invention is that through the transformation of the simulation progression to the measurement progression, the melt front is located at the same point in both curves with the same screw position. For this, the transformation parameters need not be fed back into the simulation model. A mapping of filling patterns from the simulation onto the real screw position over the virtual screw position is thus possible and a visualization of the melt front based on the real screw position can be carried out on the control system by means of the simulated filling patterns.

In addition to the visualization of the melt front, the calculated variables from the simulation can also be displayed (injection, holding pressure, cooling behaviour, warpage, etc.).

Protection is likewise sought for a moulding machine which is set up to carry out the methods according to the invention.

For this purpose, various sensors can be present in order to measure the parameters that are characteristic of the process and optionally further parameters. These can be connected or connectable to a central machine control system of the moulding machine. The methods according to the invention can be implemented on this machine control system by means of software, i.e. the central machine control system can represent the computer on which the computer program products according to the invention can be executed.

The executing computer can alternatively also be arranged remote from the moulding machine and connected to various elements of the moulding machine via a remote data transmission connection, e.g. in the form of a computer server connected in this way. Finally, the computer can also be realized by distributed computing, i.e. the functions of the control and/or regulation unit are then executed by a plurality of computing processes, which can run on different computers independently of the position of the moulding machine.

As already mentioned, by moulding machines may be meant injection-moulding machines, transfer-moulding presses, presses and the like.

In a particularly preferred embodiment, the automatic performance of the methods according to the invention is provided or, in other words, the computer program products according to the invention are designed to automatically execute the corresponding commands. However, a manual or partially automated implementation of the invention is naturally also conceivable.

The process to be carried out with the moulding machine can involve a melt front which splits or is split. A coming together of the split melt fronts can also be provided.

The simulation can consist of partial simulations or, for one simulation result, several simulations of the physical and/or chemical process can be carried out, the results of which can be combined.

Within the framework of the invention, one or more transformations can be used. These can be applied consecutively or in combination. In particular, the minimization according to the invention of the error measure can be applied between different transformations or after all transformations have been applied. That is to say the minimization of the error measure can be carried out once or several times in the methods according to the invention.

If more than one minimization of the error measure is carried out, a single error measure can be used or different error measures can be used for each minimization.

Naturally, the deviation between the measurement progression and the transformed simulation progression or the deviation between the simulation progression and the transformed measurement progression can be formed several times and the minimization of the error measure can accordingly be carried out several times.

Particularly preferably, the positions of the real moulding material front are displayed on a visualization unit of a moulding machine, by means of which the process was carried out, or on a separate visualization unit. An image that is easily accessible for an operator can thereby be provided, which makes it possible for them to easily expedite or check the optimization. The visualization unit can be integrated in the central machine control system of a moulding machine.

The visualization unit and/or the separate visualization unit can particularly preferably be formed as a display screen.

Particularly preferably, a moulded part geometry of a moulded part to be produced by the real process and/or machine settings of a moulding machine used when the real process is carried out are taken as a basis for the simulation.

From the outset, the simulation can thereby be brought as close as possible to the real process, with the result that the simulation deviations between the measurement progression and the simulation progression are as small as possible.

In principle, however, it is also possible to use e.g. generic machine settings for the simulation, which were not set on the moulding machine in the real process, and to allow the deviation to be detected by the method according to the invention.

To carry out the process, a plasticizing unit with a plasticizing screw arranged in a plasticizing cylinder can be used for providing a moulding material and for introducing the moulding material into at least one mould cavity.

The plasticizing screw can also be referred to as screw for short and the plasticizing cylinder can also be referred to as barrel for short.

In addition to a plasticizing screw, other types of actuators, such as for example injection rams, can for example also be used, however.

The simulation progression and/or the measurement progression and/or the positions of the simulated moulding material front and/or the positions of the real moulding material front can particularly preferably be parameterized by means of a time index or a position index of an actuator used in the moulding process, in particular of the plasticizing screw.

In the most general case, any desired variables of the moulding process which correlate with the progress of the process can be used as such an index (thus "X-axis" of the progression). Further preferred examples are: a volume of the moulding material within a particular area (e.g. inside the moulding cavity in the case of an injection-moulding process), a volume flow rate (e.g. into the moulding cavity), (target or actual value) of an actuator speed (e.g. of the screw), a (representative or average) shear rate.

This means that, for example, the measurement progression can then consist of pairs of values with an index parameter and a value of the variable that is characteristic of the moulding process.

Instead of a time parameter, an actuator position of an actuator used in the moulding process can also be used. In the example of an injection-moulding process, the distance that the screw (or any other injection ram) travels during the injection can for example be used, which is also referred to as screw advance. Because the movement of the actuator is generally predefined via a profile, it would be possible to convert the mentioned progressions and positions between a time indexing and a position indexing of the actuator.

If the movements of the actuator are not also detected in the simulation, analogous parameters can nevertheless be used since boundary and/or starting conditions have to be predefined in the simulation in order to model the process. For example, a volume flow profile can be defined via virtual actuator positions, which represent equivalents of the actuator positions in the real process.

Alternatively, the actuator positions from the real process can be used in order to define a volume index which corresponds to the volume flow profile for the simulation and can be used as time index. To accurately align the volume index from the simulation and from the real process is an achievement of the invention. This applies both to the positions of the moulding material front and the measurement and simulation progressions.

In particular, in the case of an injection-moulding process as moulding process, at least one of the following can be used as variable that is characteristic of the process (or a sub-process thereof): a spraying pressure (injection pressure), a moulding material pressure, a melt pressure, a mould internal pressure, a mould internal temperature, a moulding material temperature, an injection speed, a torque, an injection work, a mould breathing, a real volume flow rate.

Regression methods that are known per se are an example of methods which can be used in order to determine the at least one parameter value for the at least one parameter.

"Least squares" (of deviations) would be a specific example of an error measure which can be used.

Particular parts of the simulation progression and/or the measurement progression and/or the transformed simulation progression and/or the transformed measurement progression can be provided with a weighting in the determination of the at least one parameter value, in order to achieve a particularly good correspondence in important parts of the progressions and/or to allow a poorer correspondence in unimportant parts.

It can be provided that at least one of the following is effected during the performance of the real moulding process:
  determination according to the invention of the at least one parameter value,
  determination according to the invention of the positions of the real moulding material front,
  presentation of the positions of the real moulding material front.

The determination of the positions of the moulding material front can thereby still be carried out during the process and it may even be possible to represent the movement of the moulding material front in real time or close to real time.

In principle, the methods according to the invention can, however, also be carried out after the simulation and after the real process.

In this connection, it should be mentioned that the sequence of the method steps according to the invention is predefined only by logic and not by the sequence in the independent claims. For example, it is also entirely possible first to carry out the real process and then the simulation. Likewise, it is also entirely possible-depending on the predetermined error measure—for the application, at least once, of the transformation to the simulation progression or the measurement progression to take place only within the framework of the minimization of the error measure.

In the context of the minimization of the error measure, by minimization of the deviation is also meant the maximization of a negatively defined deviation.

The method can be applied to results of the simulation carried out again, wherein this is repeated until a simulation deviation between the simulation progression and the measurement progression is sufficiently small according to a predefined criterion.

The following would be examples of criteria which can be used to interrupt the thus-started loop:
  A limit value could for example be used for the at least one determined parameter value itself as it quantifies the deviation. That is to say, the simulation is good enough when the at least one determined parameter value falls within a certain value range (depending on the transformation). In addition, a weighting can be used to reflect that, for example, at higher pressures a better correspondence is necessary than at lower pressures, and vice versa.
  Areas under the (transformed) simulation progressions and the (transformed) measurement values and/or maximum values of the same can be compared.
  A tolerance range for the deviation of the transformed simulation progression from the measurement progression (or vice versa) can be established, within which the simulation is classified as good enough within the scope of the criterion.
  The error measure between (transformed) simulation progression and (transformed) measurement progression can be used as further criterion. One example would be a goodness-of-fit parameter which results from the minimization of the error measure.

Of course, all (inclusive and/or exclusive) combinations of these criteria can also be used.

The limit values and/or tolerances can be chosen such that
  a difference of less 10%, preferably 5% and particularly preferably 1%, results with respect to a volume of the moulding material or
  a difference of less than 20%, preferably less than 10% and particularly preferably less than 1%, results with respect to a pressure of the moulding material.

Within the framework of the simulation, further position-related simulation results, in particular including shear rates, a temperature distribution and/or a pressure distribution, can be calculated.

The further position-related simulation results can be matched to a real process progression by
  applying the at least one transformation with the determined at least one parameter value to spatial positions of the position-related further simulation results or
  applying the at least one inverse of the at least one transformation with the determined at least one parameter value to spatial positions of the position-related further simulation results.

The further position-related simulation results thus matched to the real process progression can be displayed on the visualization unit or on the separate visualization unit.

The positions of the real moulding material front and the matched further position-related simulation results can particularly preferably be displayed together. A visualization which is particularly intuitive for operators and at the same time provides a high level of information can thereby be achieved.

A desired process progression, in particular a filling progression for the moulding process, can be chosen from calculation results of the simulation and, on the basis of a difference between the desired process progression and the positions of the real moulding material front, settings of the moulding machine can be altered such that the positions of the real moulding material front lie closer to the desired process progression than before the alteration. In other words, a desired filling pattern can be extracted from the simulation and the determination according to the invention of the positions of the moulding material front can be used—e.g. by an operator, but also in an automated or partially automated manner—to alter the settings of the moulding machine such that the desired filling pattern or at least a filling pattern approximated to the desired filling pattern is reached.

Additional information can thereby be offered during fault finding, which could not be offered in the case of a pure alignment of the moulding material front.

The at least one transformation can include a time shift of the simulation progression or of the measurement progression, wherein the at least one parameter relates to a magnitude of the time shift, wherein the time shift is in particular caused by an unknown volume of the moulding material present in the moulding machine. That is to say the at least one parameter can indicate how far the simulation progression or the measurement progression is to be shifted.

The time shift can be caused by an unknown volume which is present in the moulding machine. This can be, for example, a melt cushion in the plasticizing cylinder, a sprue volume and/or the volume of a hot runner system of a moulding tool, which were not taken into account in the simulation. "Unknown" is thus to be understood to the effect that the volume can in principle be determined, but for whatever reason was not taken into account in the simulation.

As already described, the "time" shift can also be applied to an index, which is not the time itself, but rather for example a parameter which is the position of an actuator with a known movement profile over time.

The simulation can then be altered by altering a filling volume predefined for the simulation and/or a filling volume flow rate predefined for the simulation on the basis of the at least one determined parameter value for the magnitude of the time shift.

In other words, the determined parameter value (which quantifies the deviation between simulation and measurement progression) can be used in order to adjust the simulation such that the simulation result substantially corresponds to the real process or at least lies closer to the real process.

In the case of a shift as transformation, the filling volume or the filling volume flow rate can in particular be altered, because the machine behaviour is in many cases not detected by the simulation and an incorrect filling volume flow rate or an incorrect filling volume is used as starting point for the simulation. This can be recognized and corrected—preferably in an automated or partially automated manner—with the present invention.

The at least one transformation can include a, preferably linear, scaling of values of the at least one characteristic variable, wherein the at least one parameter relates to a magnitude of the scaling.

That is to say the scaling can for example be a multiplication of the characteristic variable by a factor.

In many cases, a material model or material parameter which does not reflect reality accurately enough forms the basis of an incorrectly scaled simulation result. This can also be recognized and corrected-preferably in an automated or partially automated manner—by the invention.

A Cross-WLF model can be used as material model for the simulation, wherein the Cross-WLF model is discussed in more detail slightly further below.

A 2-domain Tait model can be used for the description of the pvT behaviour of the moulding material. This model is often specified in the following form:

$$v(T, p) = v_0(T)\left[1 - C\ln\left(1 + \frac{p}{B(T)}\right)\right] + v_t(T, p)$$

A detailed description of the parameters and the included functions can be taken from the relevant literature.

A pressure offset could also be used as transformation. In particular, a systematic measurement deviation from the provision of the measurement progression can be taken into account by a pressure offset.

The at least one parameter value can be stored in a database and used when simulating and/or setting a separate process.

During use of the invention, namely valuable data can be collected which can be used effectively to further improve simulations of processes and during the discovery of settings for a plurality of moulding machines and processes carried out therewith (swarm intelligence). That is to say the generated data can be collected in central and/or decentralized databases (on premise, cloud) and thus continue to be used (keyword: swarm intelligence and machine learning). Models of the closing behaviour of non-return valves or material models which can then be supplied from extended material databases would be specific examples of aspects of simulations which can be improved by means of the generated data.

It has already been mentioned that several transformations can be carried out and the minimization of the deviation can likewise be carried out several times.

Alternatively or additionally, it is also possible to take several simulation progressions and/or several measurement progressions into account when carrying out the minimization of the deviation according to the error measure or the operator input.

For example, simulation progressions and measurement progressions of several characteristic variables can thereby be investigated, namely in particular such that deviations of several simulation progressions and several measurement progressions are minimized at the same time.

BRIEF DESCRIPTION OF THE DRAWINGS

Further advantages and details are revealed by the figures and the associated description of the figures, in which.

DETAILED DESCRIPTION OF THE INVENTION

The following embodiment examples relate to an injection process as sub-process of an injection-moulding process. An injection pressure was chosen as variable that is characteristic of this process. Of course, the invention functions analogously for other processes carried out with a moulding machine.

Figure 1:
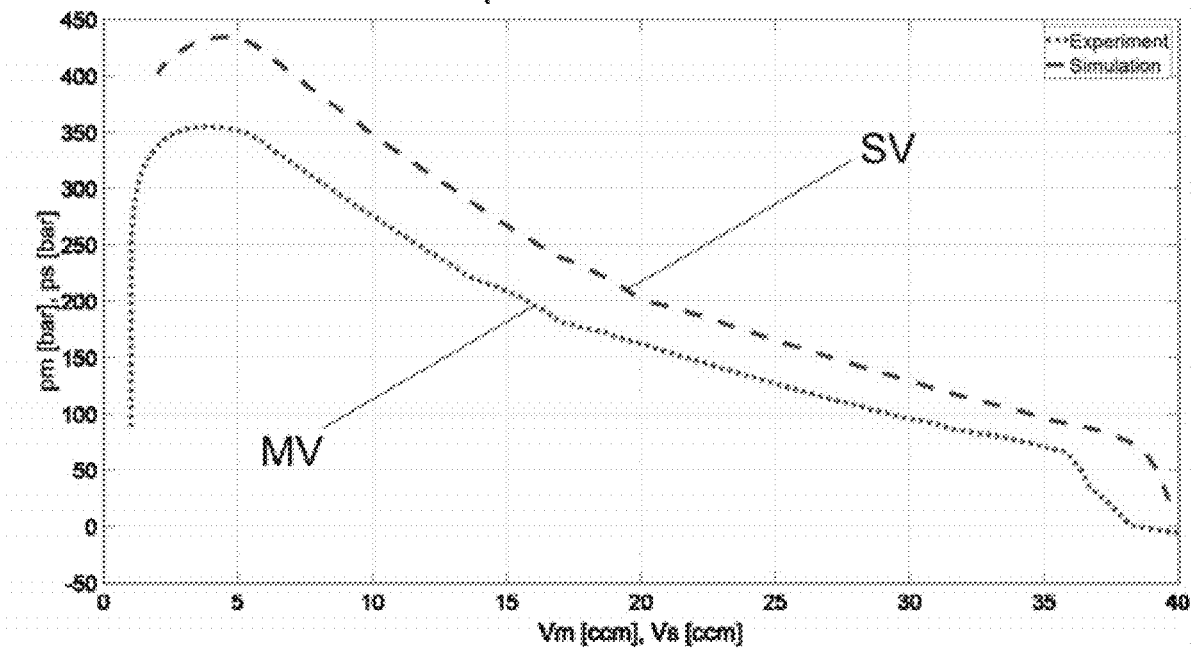
FIG. 1 is a graph with a measurement progression and a simulation progression.

FIG. 1 shows a measured (measurement progression MV) and in addition a simulated (simulation progression SV) pressure curve, wherein values from the real injection process have been used as starting and boundary conditions for the simulation. The deviation can be easily recognized. The two curves do not correspond, since for example material parameters which are used in the simulation do not correspond with the properties with the really injected material, or because e.g. the decompression and the behaviour of the non-return valve were not taken into account in the simulation.

Metering volumes which can be assigned to actuator position via the known screw geometry and the known geometry of the barrel were used here as indices Vs and Vm, which are analogous to time indices. As mentioned, the progressions of the actuator positions (screw positions) over time are known, whereby these positions can be used as "time index". Vs and Vm thus indirectly describe the volumes of the moulding material (plasticized material) introduced into the simulated and real mould cavity, respectively. The indices Vs are directly known from the simulation.

Deviations along the time indices can be captured by shifts along the X-axis within the framework of the invention (time shift). The mathematical transformation, which can be used for this purpose within the framework of the invention, is given by $$Vs' = Vs - \Delta V$$

wherein Vs' denotes the transformed time index and $\Delta V$ denotes the parameter of the transformation which indicates the magnitude of the shift.

Deviations along the Y-axis can be captured by scalings of the pressure within the framework of the invention. The mathematical transformation, which can be used for this purpose within the framework of the invention, is given by $$ps' = kp \times ps$$

wherein ps' denotes the transformed simulated pressure and kp denotes the parameter of the transformation which indicates the magnitude of the scaling.

Of course, instead of applying the transformations to the simulation progression SV the measurement progression MV could also be transformed, wherein the inverse of the transformation then has to be used later to determine the positions of the moulding material front.

Figure 2:
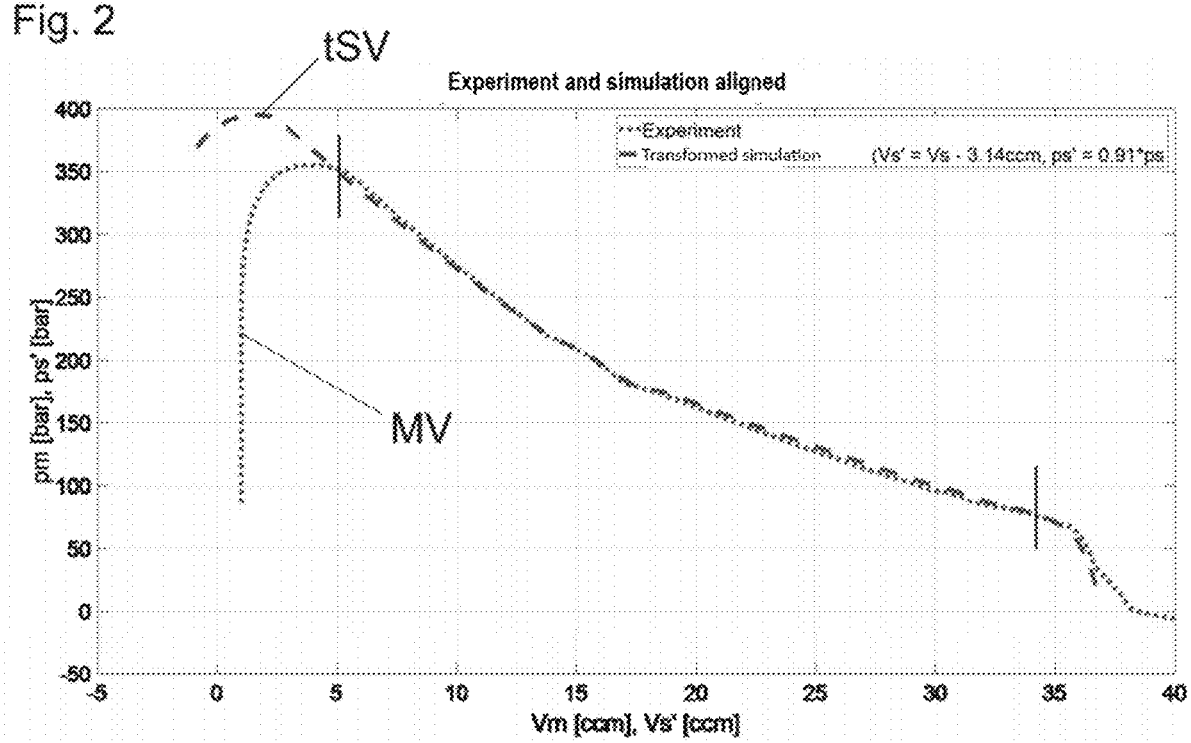
FIG. 2 is a graph with a measurement progression and a simulation progression transformed according to the invention.

FIG. 2 now shows the result of the minimization of the deviation between the measurement progression MV and the transformed simulation progression tSV. In the present example, this minimization of the deviation was carried out by a regression method known per se (here: least squares), which gives the determined numerical parameter values for $\Delta V$ and kp, here namely 3.14 ccm and 0.91 (dimensionless).

It should be mentioned that a weighting was used in order to give the alignment of the simulation progression SV with the measurement progression MV greater weight in the important range between the vertical lines represented in FIG. 2 (at approximately 5 ccm and slightly less than 35 ccm). In the specific example present here, the weightings were set to zero outside the vertical lines.

It can be seen that the two curves are now well aligned (in this type of transformation in the marked partial range of the simulation curve between 5 ccm and 34 ccm).

It follows therefrom that the melt front is located at the same point in both curves with the same screw position. A mapping of the filling patterns from the simulation onto the real screw position over the virtual screw position has thus been carried out and a visualization of the melt front based on the real screw position can thus now be carried out without problems on the control system by means of the simulated filling patterns.

By applying the transformations with the determined parameter values to the positions of the moulding material front known from the simulation, positions of the real moulding material front can be determined in the injection-moulding process. (As mentioned, it would naturally be necessary here to use the inverses of the two transformations, if the measurement progression was originally transformed).

Figure 3:
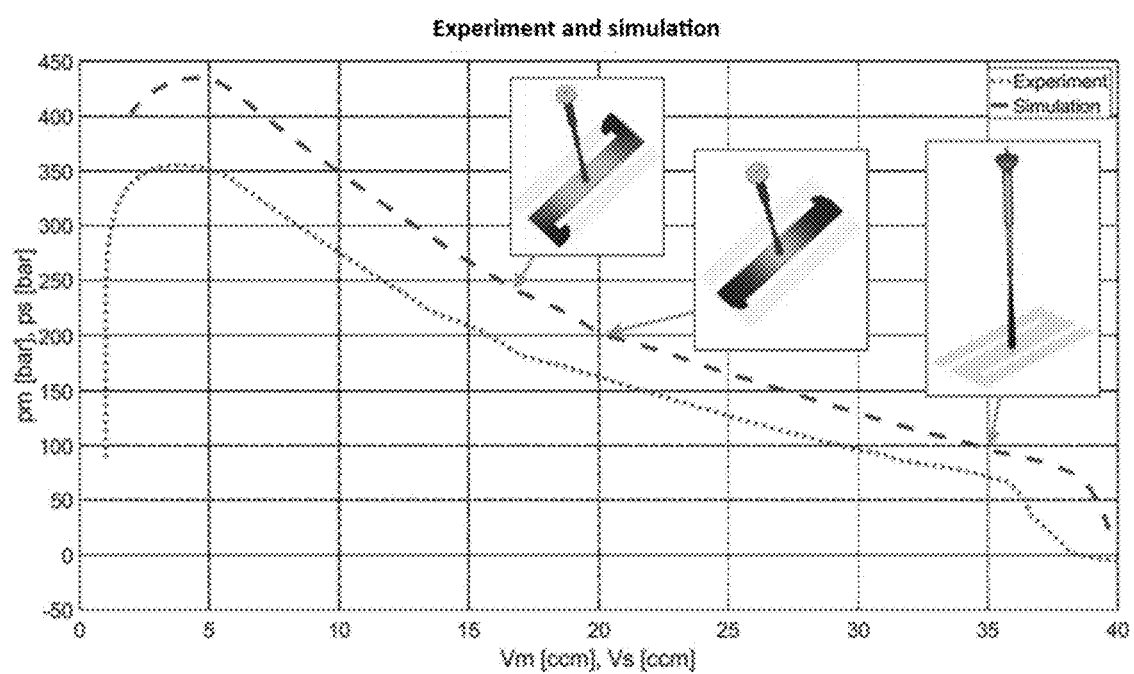
FIG. 3 is a graph with a measurement progression and a simulation progression, in which positions of moulding material fronts are visualized.
Figure 4:
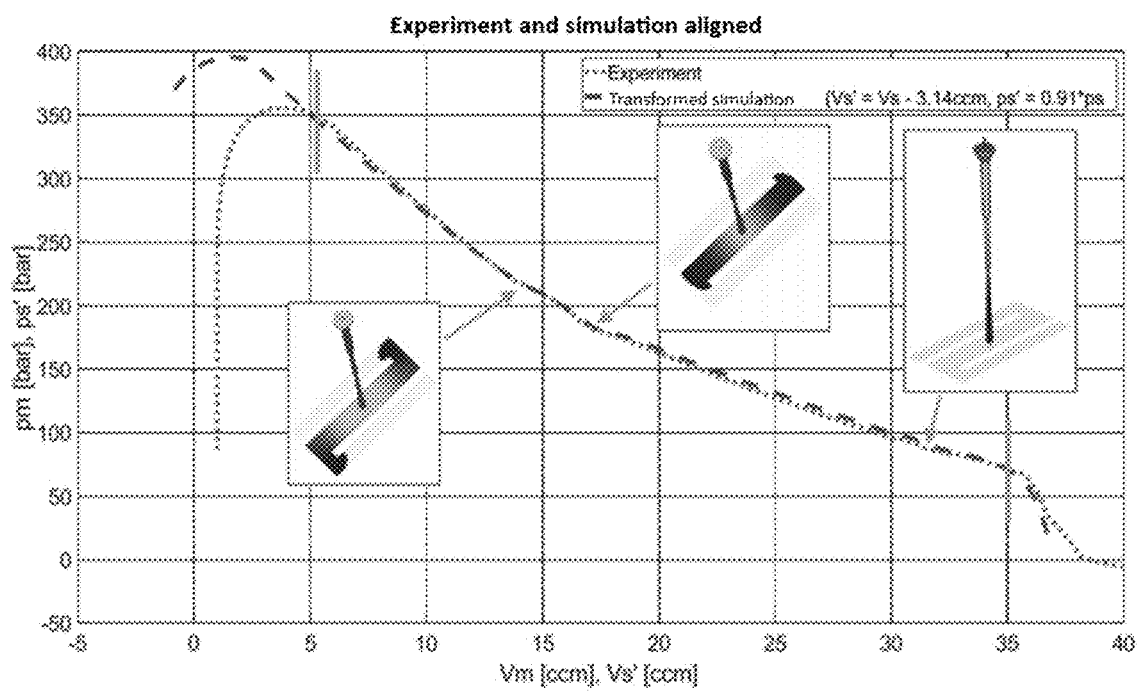
FIG. 4 is a graph with a measurement progression and a simulation progression transformed according to the invention, wherein the real positions of the moulding material fronts ascertained according to the invention are visualized.

FIGS. 3 and 4 respectively show FIGS. 1 and 2, wherein, at certain points, visualizations of the moulding material fronts have been added. In FIG. 3, the moulding material fronts are at those points resulting from the simulation. These positions would not yet be apparent from the measured measurement progression MV alone. The positions of these moulding material fronts present at the respective points in time are corrected in FIG. 4 according to the found parameter values $\Delta V$, kp for the transformations. In other words, the positions of the real moulding material front in FIG. 4 were determined by mapping the virtual filling patterns onto a real screw position.

The thus-corrected deviation between measurement progression MV and simulation progression SV for one thing results from an incorrect modelling of the injection profile (volume flow profile) and an incorrect material model in the simulation.

Specifically, on the one hand the incorrectly modelled volume flow profile causes the deviation along the X-axis, which was corrected by the transformation of the time index. The volume of the moulding material that has entered the mould cavity was thus incorrectly modelled ("deviation of the shot volume").

On the other hand, the incorrect material model causes the deviation of the pressure values in the Y-axis, which was corrected by the scaling of the pressure.

It should moreover be mentioned that both transformations (shifting and scaling) should be used in order to obtain accurate results. However, it is conceivable to use only the translation in the X-direction in order to determine the real positions of the moulding material front up to a certain accuracy.

In this specific embodiment of the first development of the invention, only a single simulation was carried out. An alignment of the whole simulation (pressures, positions, material models, temperatures, etc.) does not yet take place here and does not have to take place either, in order for this first method to function. Nor were any starting and/or boundary conditions retrospectively altered in the simulation and nor was the simulation repeated.

And now to an embodiment example of the further development of the invention, wherein an adjustment and repetition of the simulation are carried out:

First of all, the transformations are chosen in the same way as in the first embodiment example according to FIGS. 1 and 2 and the minimization of the deviation was likewise carried out in the same way, with the result that the same parameter values result for the parameters $\Delta V$ and kp. Next, the simulation has to be altered such that a smaller deviation from the measurement progression results, which is described below.

Figure 5:
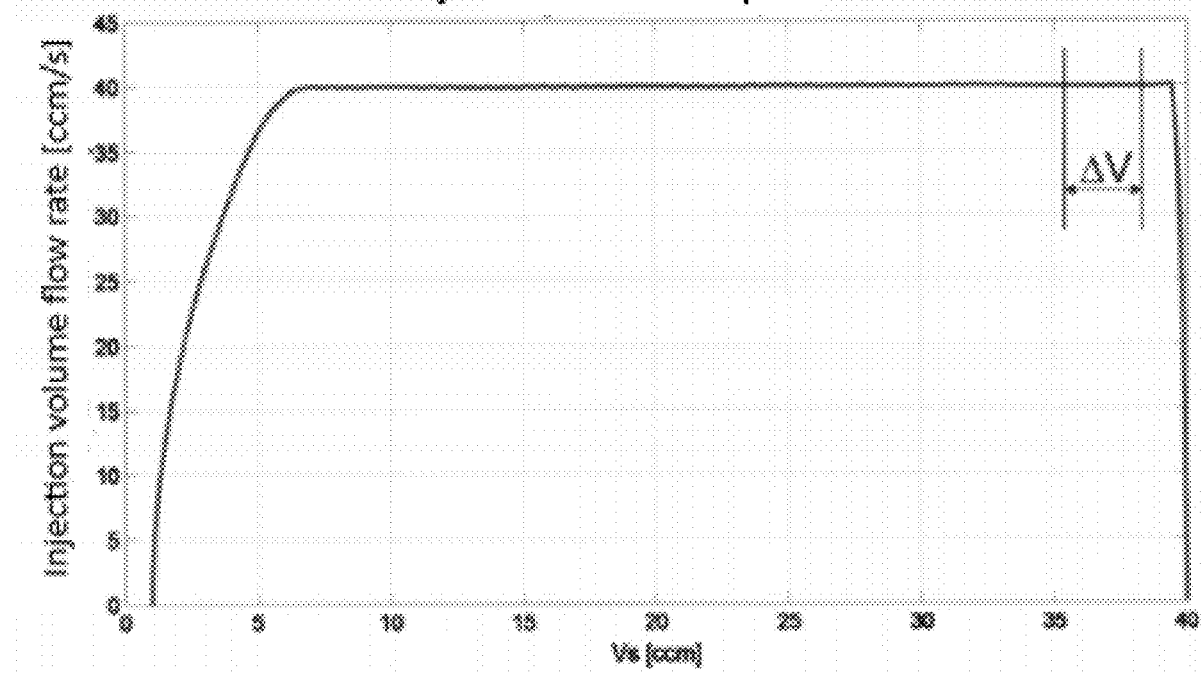
FIG. 5 is a graph of an injection or filling volume flow profile, which was a boundary condition of the simulation carried out.

FIG. 5 shows a volume flow profile which was used as boundary condition for the simulation. The determined parameter $\Delta V$ finds an equivalent that is easy to interpret in the volume flow profile from FIG. 5, which was indicated by two vertical lines there. Incidentally, this was made possible by a clever choice of the time index in the form of a volume Vs of the moulding material introduced into the mould cavity. This is, however, not absolutely necessary for the invention. Naturally, other time indices can also be used, which then have to be converted for correcting the volume flow profile.

Figure 6:
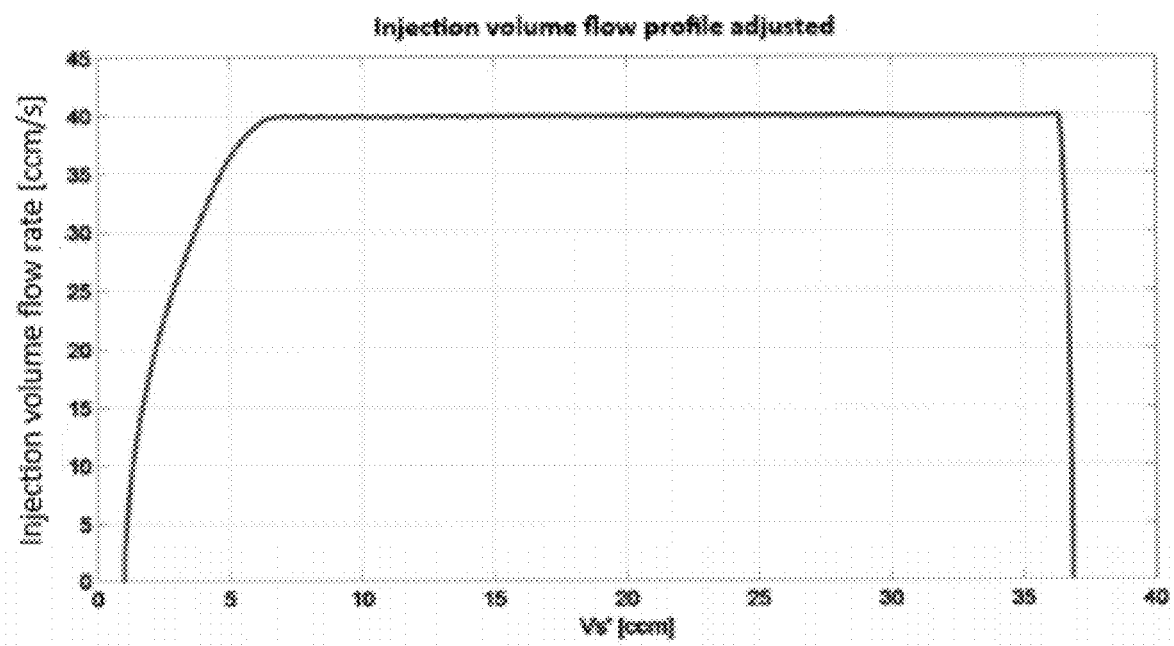
FIG. 6 shows a volume flow profile altered according to the further development of the invention.

As mentioned, it can be seen from FIG. 5 that the parameter value for $\Delta V$ occurs as a volume flow profile that is too "long". This deviation can be compensated for by a "shortened" volume flow profile, which is represented in FIG. 6, which is used for the upcoming repetition of the simulation.

Next, the material model has to be adjusted, with the result that the incorrect pressure scaling-quantified by the parameter value for kp—is compensated for.

The so-called Cross-WLF model was used as material model for the simulation.

The Cross-WLF model gives the melt viscosity $\eta$ of the moulding material as follows:

$$\eta = \frac{\eta_0}{1 + \left(\frac{\eta_0 \dot{\gamma}}{\tau^*}\right)^{1-n}}$$

Therein:
$\eta$ denotes the melt viscosity in Pa*s,
$\eta_0$ denotes the zero shear viscosity in Pa*s,
$\dot{\gamma}$ denotes the shear rate (unit 1/s),
$\tau^*$ denotes the critical shear stress at the transition to shear thinning, and
n denotes an exponent which describes the shear thinning behaviour at high shear rates.

The zero shear viscosity is given by the following equation:

$$\eta_0 = D_1 \exp\left[-\frac{A_1(T - T^*)}{A_2 + (T - T^*)}\right]$$

In the present embodiment example, this Cross-WLF model is adjusted by specifying new parameters D1' and $\tau^{*'}$ using the parameter value for kp, namely defined by $$D1' = D1 \times kp$$

and $$\tau^{*'} = \tau^* \times kp$$

The thus-altered simulation is carried out again with the values 3.14 ccm and 0.91 for $\Delta V$ and kp, respectively.

Figure 7:
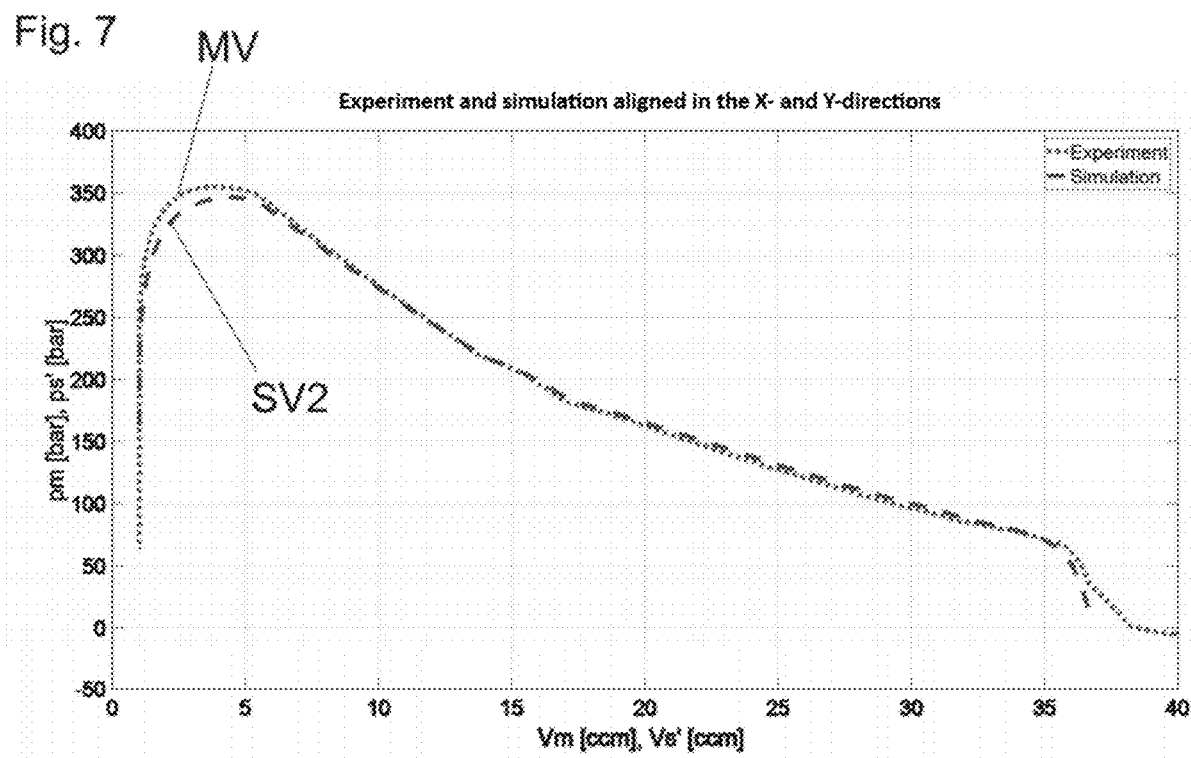
FIG. 7 is a graph with a measurement progression and a simulation progression which was carried out with the altered volume flow profile and a corrected material model.

The simulation result—that is the second simulation progression SV2 from the altered simulation carried out again—is represented in FIG. 7 together with the measurement progression MV. It can clearly be seen that a very good correspondence arises between the measurement progression MV and the second simulation progression SV2, namely already after the first repetition of the simulation, with the result that further iteration steps are not necessary in this example.

It is not necessary to feed both parameters $\Delta V$ and kp back into the simulation at the same time and then repeat the simulation. It is also possible to use only one parameter or to feed different parameters back into the simulation one after another several times.

For example, only the shifting parameter $\Delta V$ can be fed back into the simulation. Here, only the injection volume flow profile, as previously described in connection with FIGS. 5 and 6, is adjusted in the simulation and the simulation is repeated. The material model, which was previously also altered, remains unaltered in this case in relation to the starting simulation. When the simulation is repeated, the simulation result represented in FIG. 8 is then obtained, namely the third simulation progression SV3.

Figure 8:
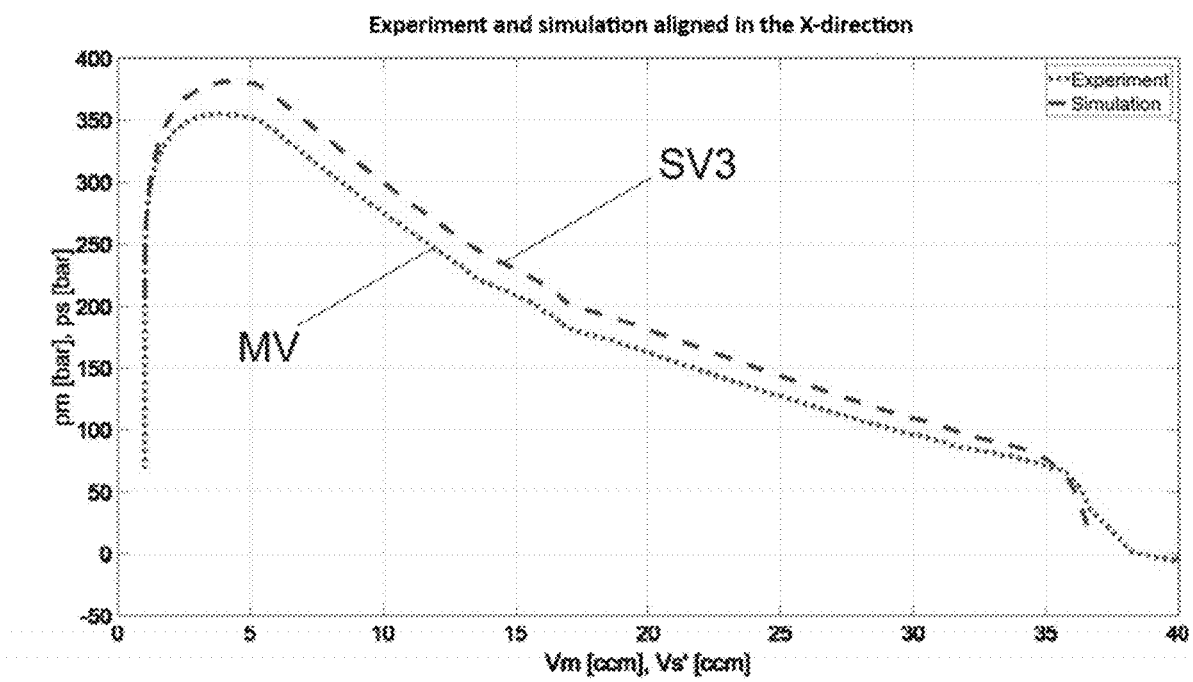
FIG. 8 is a further graph with a measurement progression and a simulation progression which was carried out with the altered volume flow profile.

In FIG. 8, the alignment in the X-axis and the remaining deviation in the pressure scaling can clearly be seen. In a further step, this deviation could also be corrected by fitting a scaling.

Figure 9:
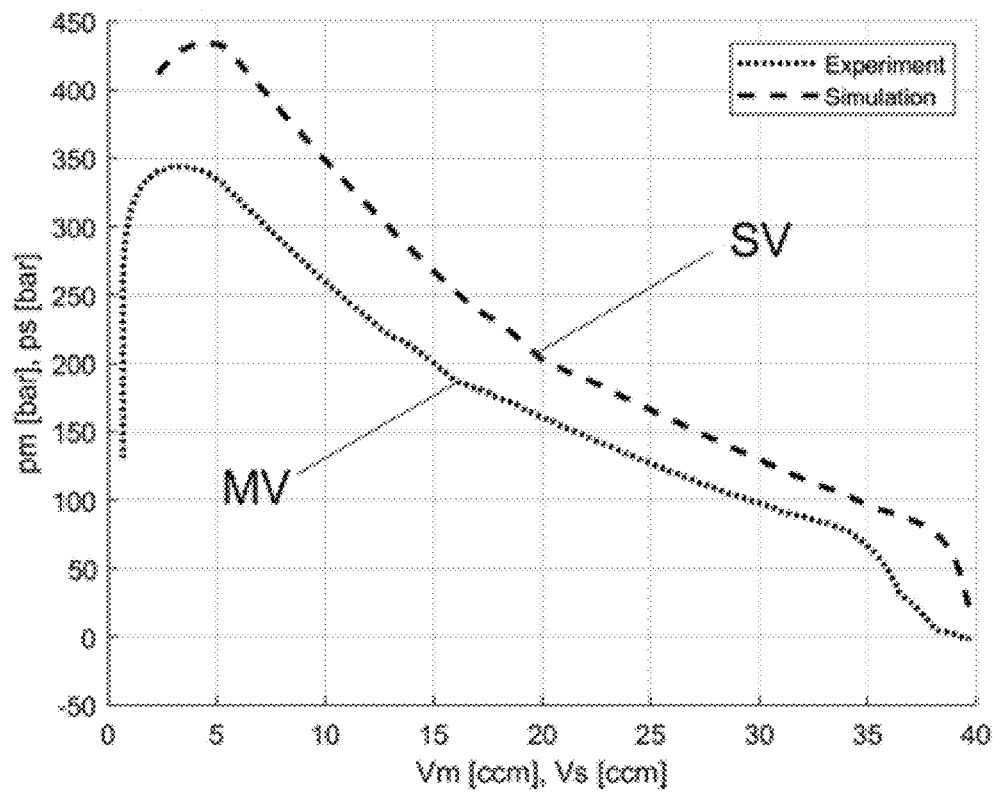
FIG. 9 is a graph with a measurement progression and a simulation progression, wherein an unknown volume was not taken into account in the simulation.

Further types of deviations can also be quantified and corrected in the simulation by the method according to the invention in the further development. An embodiment example of this is described in the following in connection with FIG. 9.

In many cases, specifically not the whole moulding material volume, which is located in front of the injection device (e.g. screw), is modelled in the simulation. Either only the moulded part geometry is simulated at all and the space in front of the screw and the nozzle are not taken into account or the entire hot runner geometry is disregarded. The accurate values of these volumes are often also not known. The compression of the moulding material volume not taken into account in the simulation therefore leads to a deviation between simulation progression SV and measurement progression MV. The simulation thus deviates from the measurement by an unknown volume $V_{unknown}$ (can also be referred to as "dead volume"). The change in this unknown volume $V_{unknown}$ when a pressure is applied can be described by the following equation term:

$$V_{unknown}\left(\frac{1}{\left(\frac{K_0 + K_1 p}{K_0}\right)^{1/K_1}} - 1\right)$$

$K_0$ and $K_1$ are constants which describe the pressure-dependent bulk modulus of the moulding material in the following approximated form $K(p) = K0 + K1*p$. Further possibilities for describing the compression of the moulding material can be taken from the state of the art (DE102016005780, DE102015117237).

The above expression can be used directly for the following transformation:

$$Vs' = Vs + V_{unknown}\left(\frac{1}{\left(\frac{K_0 + K_1 p}{K_0}\right)^{1/K_1}} - 1\right)$$

Vs' again denotes the transformed time index and $V_{unknown}$ is the parameter of the transformation, the parameter value of which is to be found according to the invention.

The two transformations described in connection with FIGS. 1 and 2 are combined with this transformation, with the result that the transformations as a whole are defined as follows:

$$Vs' = Vs + V_{unknown}\left(\frac{1}{\left(\frac{K_0 + K_1 k_p p}{K_0}\right)^{1/K_1}} - 1\right) - \Delta V$$

for the transformations of the time index and $$ps' = kp \times ps$$

the transformation of the pressure as variable that is characteristic of the process.

Figure 10:
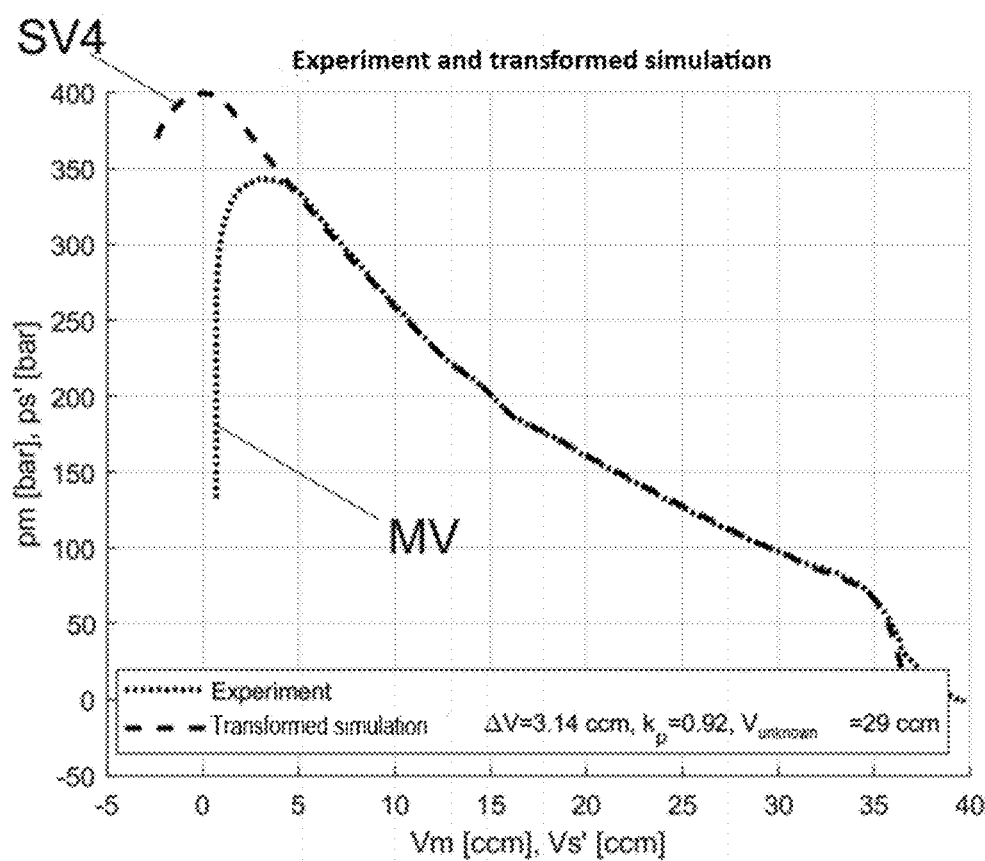
FIG. 10 is a graph with a measurement progression and a transformed simulation progression, wherein transformations were carried out with the three transformation parameters ($\Delta V$, kp, $V_{unknown}$).

In this example, the constants $K_0$ and $K_1$ are assumed to be known, the transformation parameters are thus $V_{unknown}$, $\Delta V$, kp. If these transformation parameters are ascertained accompanied by minimization of the error measure—analogously to the description in connection with FIG. 7—the progressions MV and SV4 and transformation parameters ($\Delta V$=3.14 ccm, kp=0.92, $V_{unknown}$=29 ccm) represented in FIG. 10 result.

In principle, the constants $K_0$ and $K_1$ could also be regarded as parameters within the meaning of the invention and parameter values for $K_0$ and $K_1$ could be ascertained by the method according to the invention.

The unknown volume could be fed back into the simulation in this embodiment example by modelling an additional hot runner volume with the ascertained transformation parameter $V_{unknown}$. Of course, the other adjustments of the time shift ($\Delta V$) and of the scaling (kp) would then also be performed in the simulation.

The transformation with respect to the unknown volume can naturally also be used to adjust the positions of the moulding material fronts, such as was described in connection with FIGS. 1 and 2.

The invention claimed is:

1. A method for determining positions of a real moulding material front during an injection moulding process carried out with a moulding machine, the method comprising:
   within the framework of a simulation of the injection moulding process, calculating at least one simulation progression (SV) of at least one variable that is characteristic of the injection moulding process;
   determining positions of a simulated moulding material front from the simulation;
   carrying out the injection moulding process as a real injection moulding process, wherein at least one measurement progression (MV) of the at least one characteristic variable is measured directly or indirectly;
   choosing at least one transformation which has at least one parameter ($\Delta V$, kp, V.sub.unknown);
   applying the at least one transformation at least once to the at least one measurement progression (MV), with a result that at least one transformed measurement progression is formed;
   determining at least one parameter value for the at least one parameter ($\Delta V$, kp, V.sub.unknown) such that a deviation between the at least one simulation progression (SV) and the at least one transformed measurement progression is minimized according to a predetermined error measure or according to an operator input;
   determining the positions of the real moulding material front by applying at least one inverse of the at least one transformation with the determined at least one parameter value to the positions of the simulated moulding material front;
   choosing a desired material front progression for the real injection moulding process; and
   based on a difference between the desired material front progression and the positions of the real moulding material front, altering settings of the moulding machine, wherein an actuator of the moulding machine is controlled according to the altered settings such that the positions of the real moulding material front are brought closer to the desired material front progression, and wherein a moulded part is produced by the real injection moulding process.

2. The method according to claim 1, wherein the real moulding material front is a melt front,
   wherein the at least one simulation progression (SV) of the at least one variable that is characteristic of the injection moulding process includes a simulated pressure progression, and
   wherein the at least one measurement progression (MV) of the at least one characteristic variable includes a measured pressure progression.

3. The method according to claim 1, wherein the positions of the real moulding material front are displayed on a visualization unit of the moulding machine, by means of which the real injection moulding process was carried out, or on a separate visualization unit.

4. The method according to claim 1, wherein at least one of the determining of the at least one parameter value, the determining of the positions of the real moulding material front, and presentation of the positions of the real moulding material front, is effected during a performance of the process.

5. The method according to claim 1, wherein within the framework of the simulation, further position-related simulation results are calculated.

6. The method according to claim 5, wherein the further position-related simulation results are matched to a real process progression by
   applying the at least one transformation with the determined at least one parameter value to spatial positions of the further position-related simulation results, or
   applying the at least one inverse of the at least one transformation with the determined at least one parameter value to spatial positions of the further position-related simulation results.

7. The method according to claim 3, wherein further position-related simulation results are matched to a real process progression and are displayed on the visualization unit or on the separate visualization unit.

8. The method according to claim 7, wherein the positions of the real moulding material front and the matched further position-related simulation results are displayed together.

9. The method according to claim 1, wherein the at least one simulation progression (SV) and/or the at least one measurement progression (MV) and/or the positions of the simulated moulding material front and/or the positions of the real moulding material front are parameterized by means of a time index or a position index (Vm, Vs) of the actuator.

10. The method according to claim 1, wherein the at least one transformation includes a time shift of the at least one simulation progression or of the at least one measurement progression, wherein the at least one parameter ($\Delta V$, $V_{unknown}$) relates to a magnitude of the time shift.

11. The method according to claim 1, wherein the at least one transformation includes a scaling of values of the at least one characteristic variable, wherein the at least one parameter (kp) relates to a magnitude of the scaling.

12. A computer program product for determining positions of a real moulding material front during an injection moulding process carried out with a moulding machine, comprising a non-transitory computer-readable medium having stored thereon executable instructions, which when executed, cause a computer to perform a method comprising:

calculating at least one simulation progression (SV) of at least one variable that is characteristic of the injection moulding process within a framework of a simulation or receiving one from a separate simulation;

determining positions of a simulated moulding material front from the simulation or receiving them from the separate simulation;

receiving at least one measurement progression (MV) of the at least one characteristic variable from the injection moulding process carried out as a real injection moulding process;

choosing at least one transformation or receiving an input as to which at least one transformation is to be chosen, wherein the at least one transformation has at least one parameter ($\Delta V$, kp, $V_{unknown}$);

applying the at least one transformation at least once to the at least one measurement progression (MV), with a result that at least one transformed measurement progression is formed;

determining at least one parameter value for the at least one parameter ($\Delta V$, kp, $V_{unknown}$) such that a deviation between the at least one simulation progression (SV) and the at least one transformed measurement progression is minimized according to a predetermined error measure or according to an operator input;

determining the positions of the real moulding material front by applying at least one inverse of the at least one transformation with the determined at least one parameter value to the positions of the simulated moulding material front, and outputting the positions of the real moulding material front;

choosing a desired material front progression for the real injection moulding process; and based on a difference between the desired material front progression and the positions of the real moulding material front, altering settings of the moulding machine, wherein an actuator of the moulding machine is controlled according to the altered settings such that the positions of the real moulding material front are brought closer to the desired material front progression, and wherein a moulded part is produced by the real injection moulding process.

13. The computer program product according to claim 12, wherein the real moulding material front is a melt front, wherein the at least one simulation progression (SV) of the at least one variable that is characteristic of the injection moulding process includes a simulated pressure progression, and wherein the at least one measurement progression (MV) of the at least one characteristic variable includes a measured pressure progression.

* * * * *